United States Patent
Harada

(10) Patent No.: US 12,032,958 B2
(45) Date of Patent: Jul. 9, 2024

(54) IMAGE FORMING DEVICE AND PROGRAM

(71) Applicant: KONICA MINOLTA, INC., Tokyo (JP)

(72) Inventor: Kazuki Harada, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 226 days.

(21) Appl. No.: 17/824,127

(22) Filed: May 25, 2022

(65) Prior Publication Data

US 2023/0007138 A1 Jan. 5, 2023

(30) Foreign Application Priority Data

Jul. 1, 2021 (JP) ................................. 2021-110183

(51) Int. Cl.
*G06F 9/00* (2018.01)
*G06F 13/14* (2006.01)

(52) U.S. Cl.
CPC ................. *G06F 9/00* (2013.01); *G06F 13/14* (2013.01); *G06F 2213/0042* (2013.01); *H04N 2201/0072* (2013.01)

(58) Field of Classification Search
None
See application file for complete search history.

(56) References Cited

U.S. PATENT DOCUMENTS

| 9,619,340 | B1* | 4/2017 | Mirkhelkar | ......... G06F 11/1469 |
| 2014/0298299 | A1* | 10/2014 | Rathina Balan | .... G06F 11/3668 |
| | | | | 717/127 |
| 2019/0279131 | A1* | 9/2019 | Gao | ................. G06Q 10/06313 |

FOREIGN PATENT DOCUMENTS

| JP | 2000047952 A | 2/2000 |
| JP | 2001084168 A | 3/2001 |
| JP | 2004220216 A | 8/2004 |
| JP | 2007156851 A | 6/2007 |
| JP | 2011258027 A | 12/2011 |

* cited by examiner

*Primary Examiner* — Craig C Dorais
(74) *Attorney, Agent, or Firm* — BUCHANAN INGERSOLL & ROONEY PC

(57) ABSTRACT

An image forming device to which an external device is detachably attached, including an interface that is able to attach to the external device, a storage that stores multi-tier architecture software, and a computer that executes the multi-tier architecture software. The multi-tier architecture software includes a lower layer that includes an operating system that manages the external device, an upper layer that includes an application program that accesses the external device via the lower layer, and an intervening abstraction layer that hides implementation of the lower layer from the upper layer. The upper layer includes an access control program that is able to save path information to access the external device to the storage, and relays access from the application program to the external device by accessing the lower layer without going through the abstraction layer and accessing the external device using the path information.

19 Claims, 11 Drawing Sheets

IMAGE FORMING DEVICE AND PROGRAM

The entire disclosure of Japanese patent Application No. 2021-110183, filed on Jul. 1, 2021, is incorporated herein by reference in its entirety.

BACKGROUND

(1) Technical Field

The present disclosure relates to image forming devices and programs, and more particularly to techniques for improving access efficiency with respect to external devices connected to image forming devices.

(2) Description of Related Art

In recent years, there is demand that more functions be added to multi-function peripherals (M P) that include printer functions, scanner function, copy function, facsimile functions, network functions, so-called box functions, and the like. In response to such demands, additional functions have come to be realized by installation of application programs on multi-function peripherals.

A multi-function peripheral is composed of various devices, and an application program for realizing an additional function may also need access to at least one of the various devices that make up the multi-function peripheral. For example, when reading or writing data to or from a universal serial bus (USB) memory mounted on a USB interface of a multi-function peripheral, as illustrated in FIG. 10, an application program 1010 uses a library (node library in FIG. 10) 1020 installed on a multi-function peripheral 10.

When an application program interface (API; fs_API in FIG. 10) 1021 for accessing a file system that manages data stored in the USB memory or the like is included in the library 1020 as a method, the application program 1010 uses this method to request that a USB interface driver 1031 built into an operating system (OS) 1030 reads and writes data to and from the USB memory.

In this way, reading and writing to and from the USB memory is executed. The same applies to USB devices other than USB memory, and to devices other than USB devices.

Rather than re-developing such an application program every time a multi-function peripheral is upgraded, development costs can be reduced if an application program can be used regardless of the version of the multi-function peripheral. Similarly, common use between different models of multi-function peripheral is desirable.

For this reason, software architecture (multitier architecture) is adopted that provides a common interface for application programs that are to be used across devices that may differ depending on version and model of multi-function peripheral and different versions and models of multi-function peripheral.

In multitier architecture, an interface between layers is specified in advance, and therefore only required layers need be developed or modified according to version and model of a multi-function device and other layers do not change and can be used as is.

As illustrated in FIG. 11, the multitier architecture of a multi-function peripheral is composed of three layers, an application layer 1110, a device control layer 1120, and an operating system layer 1130, for example. An application program 1111 that can be shared between versions and models of multi-function peripheral belongs to the application layer 1110.

A program 1122 for controlling various devices that make up a multi-function peripheral can be changed depending on version and model of the multi-function peripheral, and therefore belongs to the device control layer 1120. The operating system layer 1130 is an operating system (OS) 1131 itself, but changes such as the OS 1131 being upgraded or replaced are possible. Further, device drivers included in the OS 1131 may change as devices are added or changed.

If the OS layer 1130 includes a hardware abstraction layer (HAL), a difference in hardware that occurs due to version or model of a multi-function peripheral can be hidden from a kernel of the OS 1131 by using the HAL.

Further, as described above, when accessing USB memory, it is necessary to specify an access path. In a multitier architecture, parameters such as an access path required to access an external device mounted on a multi-function peripheral such as a USB memory are also hidden so as to not affect the application program 1111. This allows the application program 1111 to access the external device without using access parameters.

When the device control layer 1120 and the OS layer 1130 are responsible for basic functions of a multi-function peripheral and the application layer 1110 realizes additional functions, the application layer 1110 can be shared between versions and models of the multi-function peripheral, and therefore the cost for realizing the additional functions can be reduced.

In addition to simply defining interfaces between layers, details of implementation of functions of other layers can be hidden by providing an abstraction layer between the application layer 1110 and the device control layer 1120.

As an example of the application program 1111 belonging to the application layer 1110 as described above, the application program 1111 may perform image processing of image data generated by using a scanner function of the multi-function peripheral or image data acquired via a communication network such as the Internet.

By using this example of the application program 1111, a user of the multi-function peripheral can perform desired image processing on desired image data, and image formation can be performed using the processed image data. Therefore, it is easy to see printed matter obtained by image formation, confirm the result, and change image processing applied to image data as needed.

Regarding image data that has undergone image processing using the application program 1111, a user can temporarily attach a recording medium such as a USB memory that is easy to carry to the multi-function peripheral, save the image data on the recording medium, and take it home. In such a case, the following problems occur in a multi-function peripheral adopting the multitier architecture described above.

That is, the OS layer 1130 has a built-in device driver for managing device access to the recording medium, while the device control layer 1120 has an interface with the application layer 1110. Therefore, in order for the application program 1111 to store the image data on the recording medium, the application program 1111 must first access the device control layer 1120 using a defined interface and request storage of the image data on the recording medium.

The device control layer 1120 that has received a request from the application layer 1110 performs interface processing for hiding internal structure of the device control layer 1120 from the application layer 1110 and the original processing of the device control layer 1120, then accesses the OS layer 1130 to execute the request. Therefore it is necessary to go through a large number of control API.

Under these circumstances, there is a technical problem that when the application program 1111 saves image data on a recording medium, performance deteriorates due to various overheads, reducing convenience to the user and causing resources of the multi-function peripheral to be consumed unnecessarily.

SUMMARY

This disclosure is made in view of the technical problem described above, and an object of the present disclosure is to provide an image forming device and a program that can be used to suppress performance degradation when accessing a device from an upper layer in a multitier architecture that hides substructure from the upper layer.

In order to achieve at least the above object, an image forming device reflecting an aspect of the present disclosure is an image forming device to which an external device is detachably attached, the image forming device including an interface that is able to attach to the external device; a storage that stores multi-tier architecture software; and a computer that executes the multi-tier architecture software. The multi-tier architecture software includes a lower layer that includes an operating system (OS) that manages the external device attached to the interface; an upper layer that includes an application program that accesses the external device via the lower layer; and an abstraction layer that intervenes between the lower layer and the upper layer and hides implementation of the lower layer from the upper layer. The upper layer includes an access control program that is able to save path information to access the external device to the storage, and relays access from the application program of the upper layer to the external device by accessing the lower layer without going through the abstraction layer and accessing the external device using the path information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings.

DETAILED DESCRIPTION

With respect to an image reading device, image reading program, image processing device, and image processing program according to the present disclosure, the following describes a multi-function peripheral (MFP) having an image reading function as an example embodiment, with reference to the drawings.

[1] Structure of Image Forming Device 1

Figure 1:
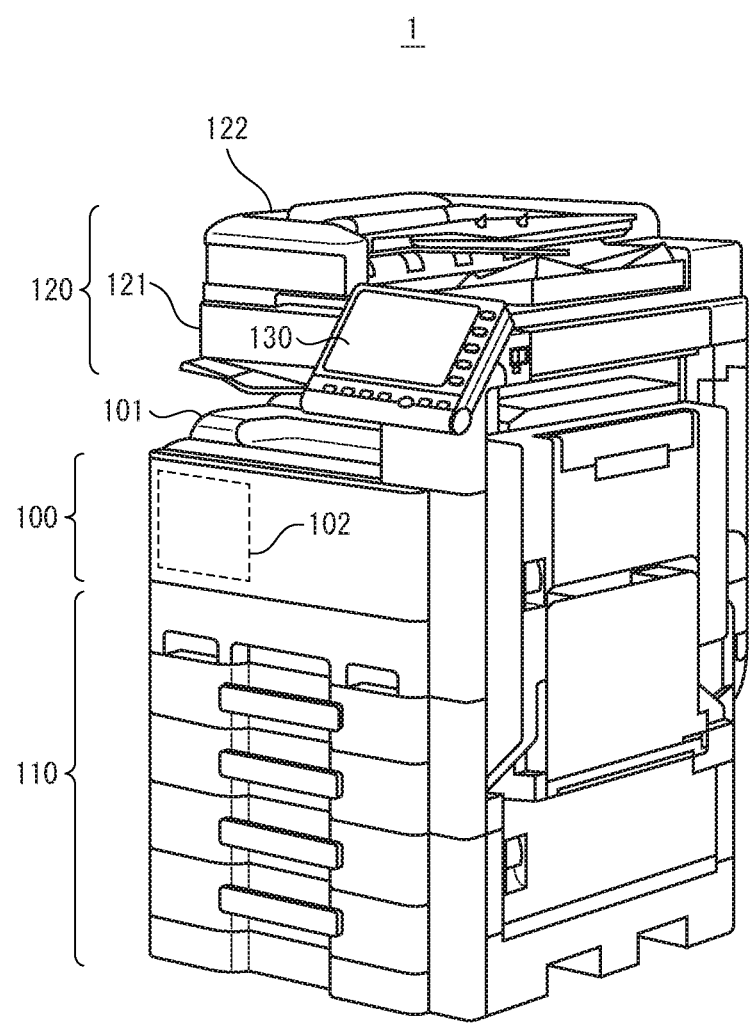
FIG. 1 is an external perspective view diagram illustrating main structure of an image forming device 1 according to at least one embodiment of the present disclosure.

The image forming device 1 according to the present embodiment is an MFP, and has functions including a printer function, a scanner function, a copy function, a facsimile function, a network function, and a box function. As illustrated in FIG. 1, the MFP includes an image former 100, a sheet feeder 110, an image reader 120, and an operation panel 130.

The image reader 120 includes a scanner 121 and an automatic document feeder (ADF) 122. When the image scanner 120 scans an image from a document by a sheet-through method, a stack of sheets on a document tray of the ADF 122 is fed out one by one and conveyed to a scanning position for scanning by the scanner 121.

The scanner 121 illuminates a scanning surface of a document passing through the scanning position, scans reflected light by using a line sensor, and generates image data line by line. Scanned documents are sequentially ejected to an ejection tray.

When scanning an image from a document by a platen set method, the document is placed on scanning glass (not shown) of the scanner 121 with a scanning surface facing the scanning glass. A lower surface of the ADF 122 is a white plate, and by pressing a back surface of the document towards the scanning glass, the scanning surface of the document is pressed against the scanning glass.

In this state, when a user of the image forming device 1 operates the operation panel 130 to issue an instruction to start scanning the document, the scanner 121 scans the document line by line to generate image data.

The image former 100 executes image forming processing by an electrophotographic method using image data generated by the image reader 120 reading an image from a document, image data received from a personal computer (PC) or other device via a local area network (LAN) or communication network such as the Internet, or image data stored by using a box function, or the like.

That is, a uniformly charged photoconductor surface (not shown) is irradiated with a laser beam modulated according to image data to form an electrostatic latent image, toner is supplied to the electrostatic latent image for development, then a resulting toner image is transferred to a sheet. Further, after the toner image carried on the sheet is heat-fixed, image forming processing is completed by ejecting the sheet on which the toner image is fixed to a sheet ejection tray 101.

The sheet feeder 110 includes sheet feed trays, and can accommodate different types of sheets for each sheet feed tray. The sheet feeder 112 supplies the image former 111 with a sheet of a type specified by a user via an image forming job or an instruction input using the operation panel 130. The image former 111 executes image forming processing as described above, using a sheet supplied by the sheet feeder 110.

The operation panel 130 includes a touch panel, a hard key, a speaker, a light emitting diode (LED), and the like. The operation panel 130 presents information to a user of the image forming device 1 on a screen of the touch panel, or the like. Further, the operation panel 130 accepts instructions input by user operation of the touch panel, the hard key, or the like. User-instructed input is, for example, input instructing reading of a document.

A user of the image forming device 1 can also use an additional function realized by an application program by operating the operation panel 130. Further, such an additional function may include processing of image data processed by an application program and saved on a recording medium (for example, a universal serial bus (USB) flash drive).

A controller 102 of the image former 100 is a computer that executes software for monitoring and controlling operations of elements of the image forming device 1. Software installed in the image forming device 1 has a multitier architecture, and as described later, software that may differ depending on version or model of image forming device and software (application program) that is common to different versions or models of image forming device belong to different layers.

[2] Hardware Structure of Controller 102

The following describes hardware structure of the controller 102.

Figure 2:
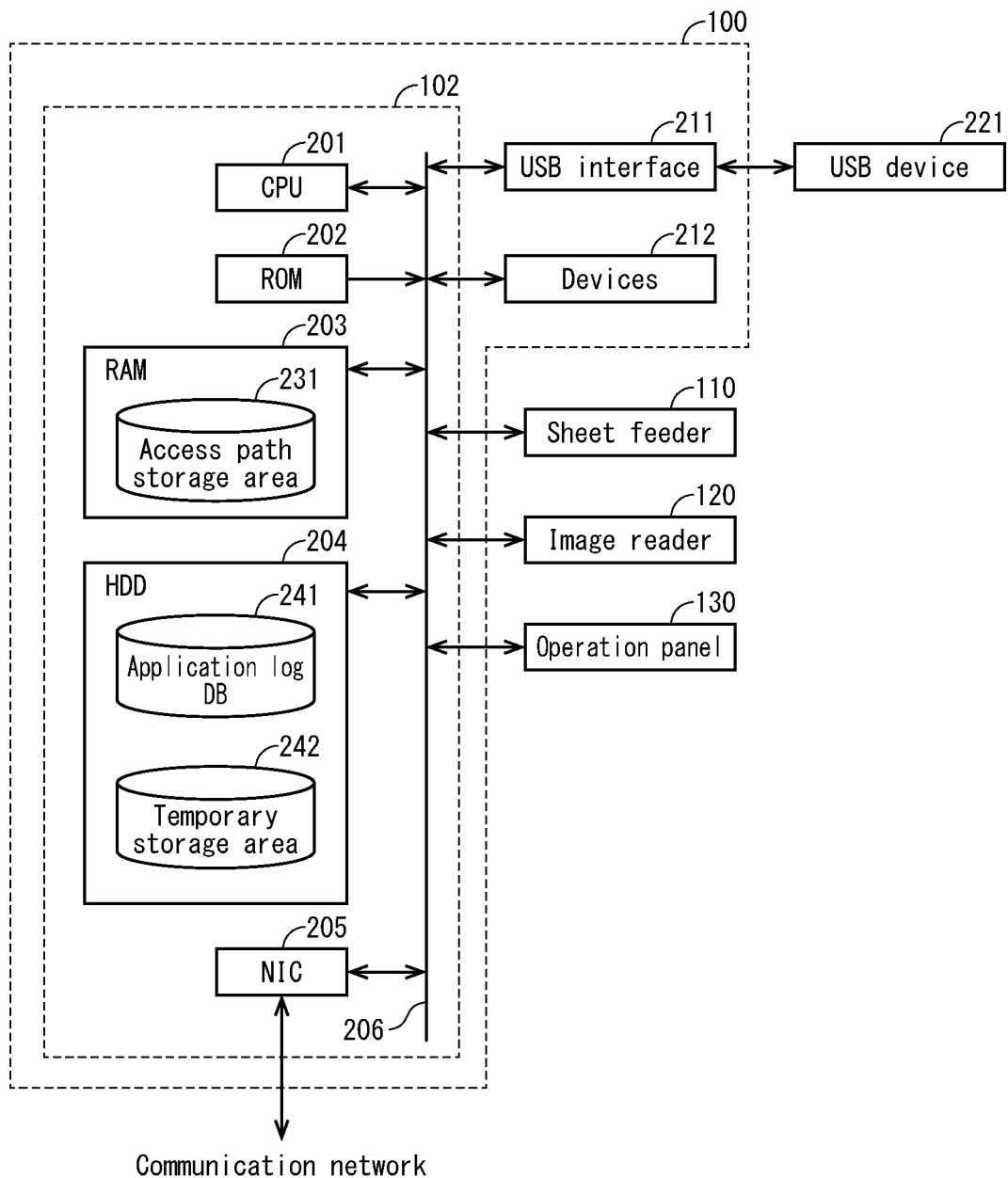
FIG. 2 is a block diagram illustrating configuration of a controller 102 included in an image former 100 of the image forming device 1.

The controller 102, as illustrated in FIG. 2, includes a central processing unit (CPU) 201, a read only memory (ROM) 202, a random access memory (RAM) 203, a hard disk drive (HDD) 204, and a network interface card (NIC) 206, which are connected to enable communication with each other using an internal bus 206.

A USB interface unit 211 and various devices 212 included in the image former 100 are connected to the internal bus 206. The USB interface 211 is an interface for connecting a USB device such as a USB memory. Further, the CPU 201 can access the sheet feeder 110, the image reader 120, and the operation panel 130 via the internal bus 206.

When a reset signal is input, such as when power is turned on to the image forming device 1, the CPU 201 reads out a boot program stored in the ROM 202, boots, and using the RAM 203 as working storage, reads out and executes an operating system (OS), device control program, application program, and the like from the HDD 204.

As described later, the RAM 203 is provided with an access path storage area 231 storing an access path, which is path information for accessing a USB device 221 mounted to the USB interface 211, in particular a USB memory. Instead of the RAM 203, the access path storage area 231 may be provided in the HDD 204.

Further, the HDD 204 is provided with an app log database (DB) 241 for storing information about problems that occurred when accessing USB memory, and a temporary storage 242 for temporarily storing data to be transferred to USB memory. The temporary storage 242 may be provided in the RAM 203 instead of the HDD 204.

The MC 205 executes processing for communicating with other devices via a communication network such as a LAN or the Internet.

The following describes an example where USB memory is attached to the USB interface 211 as the USB device 221, but the same applies to a case where the USB device 221 is something other than USB memory and is attached to the USB interface 211.

Further, in the present disclosure, the ROM 202, the RAM 203, and the HDD 204 may be collectively referred to as "a storage".

[3] Software Structure of Controller 102

The following describes software structure of the controller 102.

Software installed in the controller 102 adopts a multitier architecture so that additional functions can be realized by using a common application program even if version or model of the image forming device 1 are different.

Figure 3:
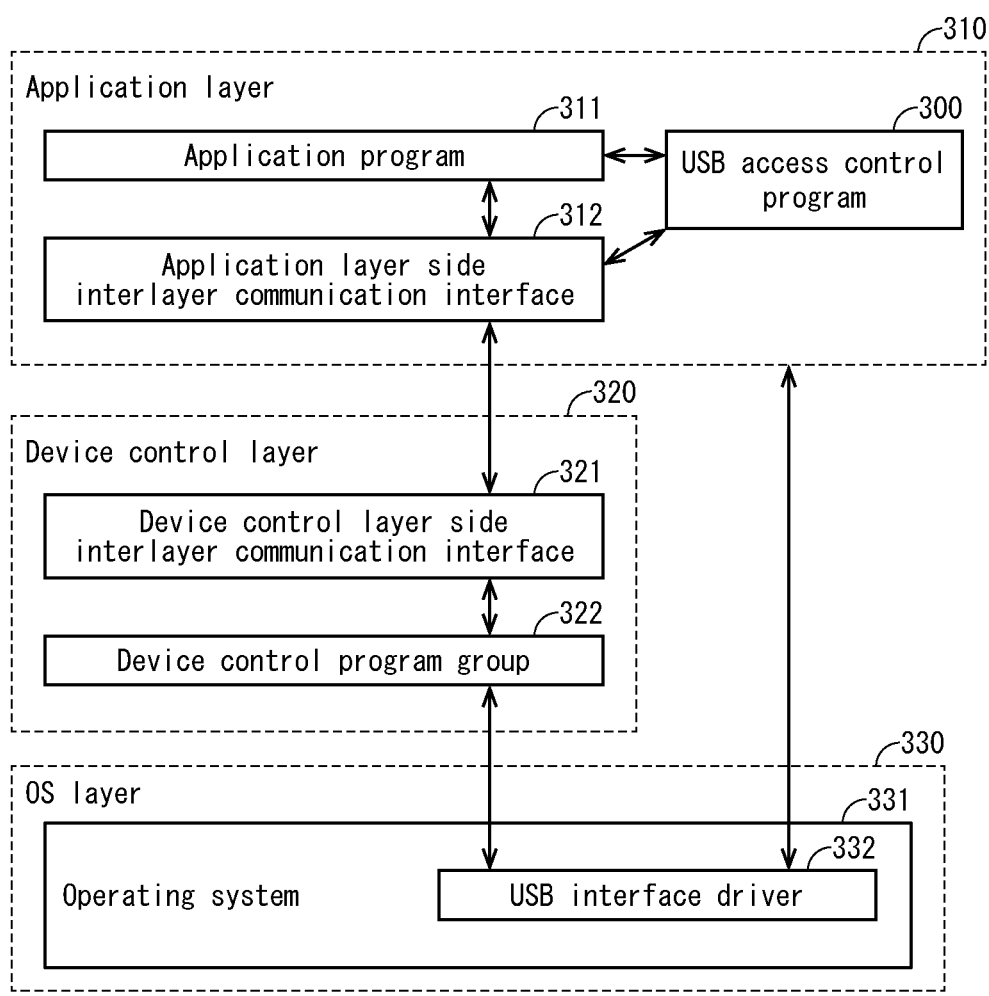
FIG. 3 is a diagram illustrating a multitier architecture 3 of software installed in the controller 102.

As illustrated in FIG. 3, the multitier architecture 3 has a three layer structure consisting of an application layer 310, a device control layer 320, and an OS layer 330.

(3-1) Application Layer 310

The application layer 310 includes an application program 311 and the like, and corresponds to an upper layer in the multitier architecture.

As described above, the application layer 310 includes the application program 311 for realizing an additional function for the image forming device 1.

The application layer 310 is provided with an interlayer communication interface 312 so the application program 311 can access various devices constituting the image forming device 1.

According to the present embodiment, the interlayer communication interface 312 on the application layer 310 side operates as a Web server. When the interlayer communication interface 312 on the application layer 310 side receives a request from the application program 311 as a Web client in accordance with the Hypertext Transfer Protocol (HTTP), the request is sent on to an interlayer communication interface 321 on the device control layer side 320, which will be described later.

When the interlayer communication interface 312 on the application layer 310 side receives a response to the request from the interlayer communication interface 321 on the device control layer 310 side, the interlayer communication interface 312 notifies the application program 311, which was the request source, of the response.

As a result, the application program 311 can acquire, for example, image data from the HDD 204 for which a user has instructed image processing.

The USB access control program 300 also belongs to the application layer 310. The USB access control program 300 is a program for relaying access of the application program 311 to the USB device.

Therefore, the USB access control program 300 accesses the USB device from the application layer 310 without going through the device control layer 320. According to the present embodiment, the USB access control program 300 is particularly used to relay access of the application program 311 to the USB device 221 mounted on the USB interface 211.

As will be described later, similarly to the application program 311, the USB access control program 300 can also use the interlayer communication interface 312 on the application layer 310 side to request processing by a device control program group 322, via the interlayer communication interface 321 on the device control layer 320 side.

(3-2) Device Control Layer 320

The device control layer 320 intervenes between the application layer 310 and the OS layer 330. That is, the device control layer 320 corresponds to an abstraction layer in the multitier architecture, and provides the application layer 310 with an interface that hides the implementation of the OS layer 330 and the device control layer 320 itself.

The device control program group 322 belongs to the device control layer 320. The device control program group 322 is a program that monitors states and controls operations of various devices constituting the image forming device 1.

The device control program group 322 monitors states and controls operations of devices such as those of the image former 100: a motor for rotationally driving a photoconductor drum, a charger device for uniformly charging an outer circumferential surface (photoconductor surface) of the photoconductor drum, an exposure device such as a laser light used to form an electrostatic latent image, and the like.

The same applies to devices constituting the sheet feeder 110, the image reader 120, and the operation panel 130.

As described above, the device control layer 320 includes the interlayer communication interface 321 in order to receive a request from the application layer 310.

The interlayer communication interface 321 on the device control layer 320 side receives a request from the interlayer communication interface 312 on the application layer 310 side as a Web application program interface (API) and transfers the request to the device control program group 322.

Further, when the interlayer communication interface 321 on the device control layer 320 side receives a response to the request from the device control program group 322, the interlayer communication interface 321 returns the response to the interlayer communication interface 312 on the application layer 310 side.

The interlayer communication interface 321 on the device control layer 320 side has the same interface specifications as the interlayer communication interface 312 on the application layer 310 side, regardless of version or model of the image forming device 1.

Accordingly, a difference in hardware, a difference in the device control program group 322, and a difference in the OS 331 (described later) due to version or model of the image forming device 1 are concealed from the application program 311.

Therefore, the application program 311 can be used even if the version and model of the image forming device 1 are different.

On the other hand, the interlayer communication interface 321 on the device control layer 320 side and the device control program group 322 that exchanges requests and responses to requests can be changed if the version or model of the image forming device 1 is different.

When the device control program group 322 is changed, the interlayer communication interface 321 on the device control layer 320 side changes the way of exchanging requests and responses to the device control program group 322 according to the change.

By changing the interlayer communication interface 321 on the device control layer 320 side in this way, the application program 311 can be used even if the version and model of the image forming device 1 are different.

(3-3) OS Layer 330

The OS layer 330 includes the OS 331 that manages various devices constituting the imager forming device 1 and external devices connected to the image forming device 1 such as USB memory, and corresponds to a lower layer in the multitier architecture.

The OS 331 incorporates device drivers corresponding to each of the various devices constituting the image forming device 1.

The device control program group 322 can access a desired device via operation of a device driver corresponding to the device by using a system call of the OS 331.

The device drivers operate as part of the OS 331 kernel code.

The device drivers built into the OS 331 include a USB interface driver 332 for accessing the USB interface 211.

The device control program group 322 can access the USB interface 211 by operation of the USB interface driver 332 using a system call of the OS 331, similarly to other devices.

According to the present embodiment, the OS layer 330 may include a hardware abstraction layer (HAL) (not shown). If the OS layer 330 includes an HAL, a difference in hardware that occurs due to version or model of a multi-function peripheral can be hidden from a kernel of the OS 331 by using the HAL.

However, as described above, when the application program 311 accesses a device via the device control layer 320 and the OS layer 330, many API calls or function calls in the device control layer 320 and the OS layer 330, or processing for abstraction or the like becomes necessary.

Therefore, by using the USB access control program 300, performance of device access by the application program 311 is improved.

[4] USB Access Control Program 300

The USB access control program 300 is described here in more detail.

Figure 4:
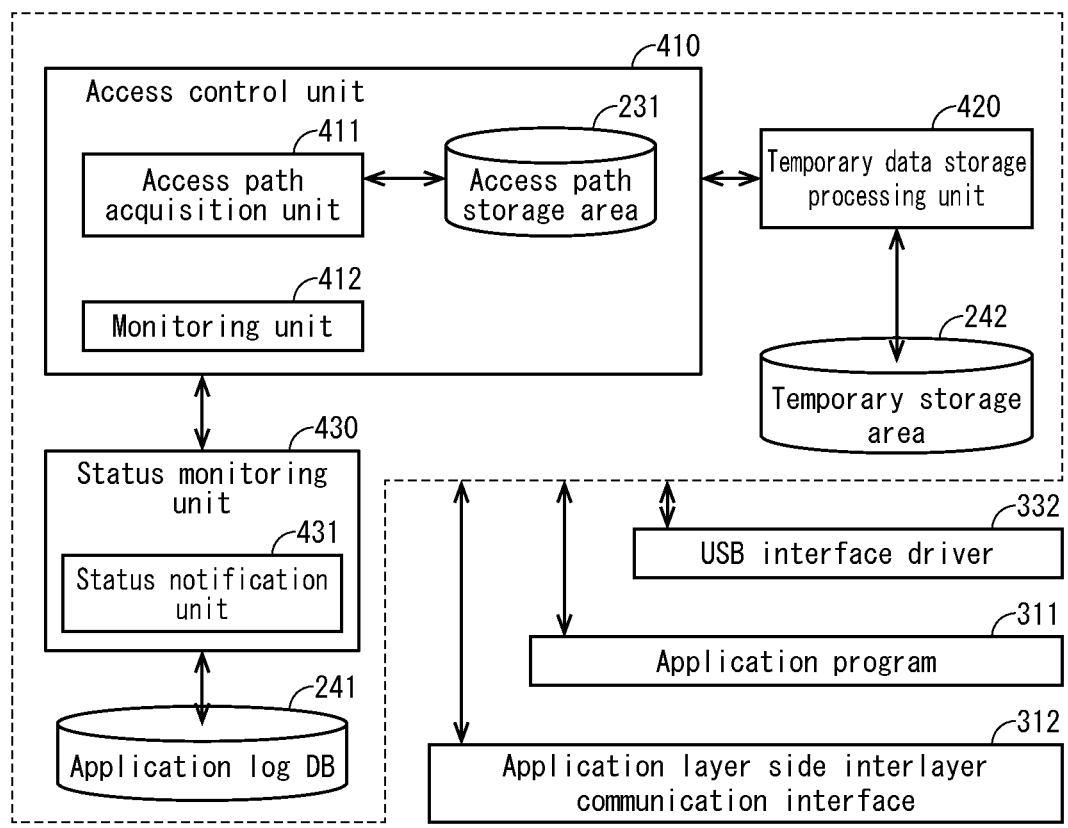
FIG. 4 illustrates a configuration of a USB access control program 300.

As illustrated in FIG. 4, the USB access control program 300 includes an access control unit 410, a temporary data storage processing unit 420, and a status management unit 430. The access control unit 410 includes an access path acquisition unit 411 and a monitoring unit 412. The status management unit 430 includes a status notification unit 431.

(4-1) Access Control Unit 410

When the access control unit 410 receives an access request from the application program 311 to the USB device 221, the access control unit 410 uses a system call of the OS 331 of the OS layer 330 to cause operation of the USB interface driver 332 to access the USB interface 211.

When USB memory is connected to the USB interface 211, the application program 311 may write data to the USB memory or read data from the USB memory via the USB access control program 300.

When the access control unit 410 accesses USB memory by using a system call of the OS 331, specifying an access path is necessary. When an access path is not stored in the access path storage area 231, the access path acquisition unit 411 uses the interlayer communication layer interface 312 on the application layer 310 side to obtain USB memory access from the OS 331. That is, the access path acquisition unit 411 is a path information acquisition program.

When the access path acquisition unit 411 acquires a USB memory access path, the access path acquisition unit 411 stores the access path in the access path storage area 231 of the RAM 203. In this way, the access control unit 410 can use the access path read from the access path storage area 231 in all future access to the USB memory.

The monitoring unit 412 monitors status of a USB memory by acquiring information on USB memory status (hereinafter, also referred to simply as "status") using a system call of the OS 331. The monitoring unit 412 may acquire the status from the hardware abstraction layer of the OS 331. When the monitoring unit 412 detects a problem (failure) related to the USB memory access, the monitoring unit 412 notifies the temporary data storage processing unit 420 and the status management unit 430.

The monitoring unit 412 may monitor a problem related to the USB memory access by repeatedly using a system call of the OS 331, or may receive a notification from the OS 331 that a problem related to USB memory access has occurred, as well as checking what kind of problem has occurred at the same timing.

In this way, the monitoring unit 412 is a monitoring program that monitors the status of a USB memory, which is an external device.

(4-2) Temporary Data Storage Processing Unit 420

When the monitoring unit 412 detects a problem that data transfer cannot continue while transferring data to USB memory, and the temporary data storage processing unit 420 temporarily waits for access to the USB memory, and is a temporary storage program that temporarily stores data that has not been transferred to the USB memory in the temporary storage area 242 of the HDD 204.

After the problem is resolved, and the status becomes a status where data can be transferred, the access control unit 410 releases a standby state of USB memory access, reads out data temporarily stored in the temporary storage area 242, and transfers the data to the USB memory.

(4-3) Status Management Unit 430

The status management unit 430 is a status management program that acquires the USB memory status from the monitoring unit 412 of the access control unit 410 and controls USB memory access according to an acquired status. For example, if the USB memory status is "interrupt", access to the USB memory requested by the application program 311 is temporarily suspended.

Further, for example, if the USB memory status is "memory full", "failure", "unknown cause", or the like, and data transfer cannot be continued, data transfer to the USB memory requested by the application program 311 may be interrupted or stopped.

The status notification unit 431 of the status management unit 430 notifies the application program 311 of the USB memory status.

Further, the status management unit 430 records status information of USB memory in an application log database (DB) 241.

[5] USB Access Control Program 300 Operation

The following describes operation of the USB access control program 300, taking a case of transferring data to and from a USB memory as an example. Of course, when writing data to the USB memory, data is transferred from the image forming device 1 to the USB memory. Further, when reading data from the USB memory, data is transferred from the USB memory to the image forming device 1.

The application program 311 requests access to the USB access control program 300 when transferring data to and from the USB memory mounted on the USB interface 211.

In this case, the USB access control program 300 may provide an API having the same specifications as the interlayer communication interface 312 on the application layer side as an API provided to the application program 311.

This API receives the access path to the USB memory and receives requests such as data transfer to and from the USB memory.

This makes it possible to write data to the USB memory and read data from the USB memory. Further, this API may return a list of files stored in the USB memory, or may return a list of files belonging to a directory or folder in the USB memory specified by the access path. Further, files stored in the USB memory may be deleted in units of files, directories, or the like.

Figure 5:
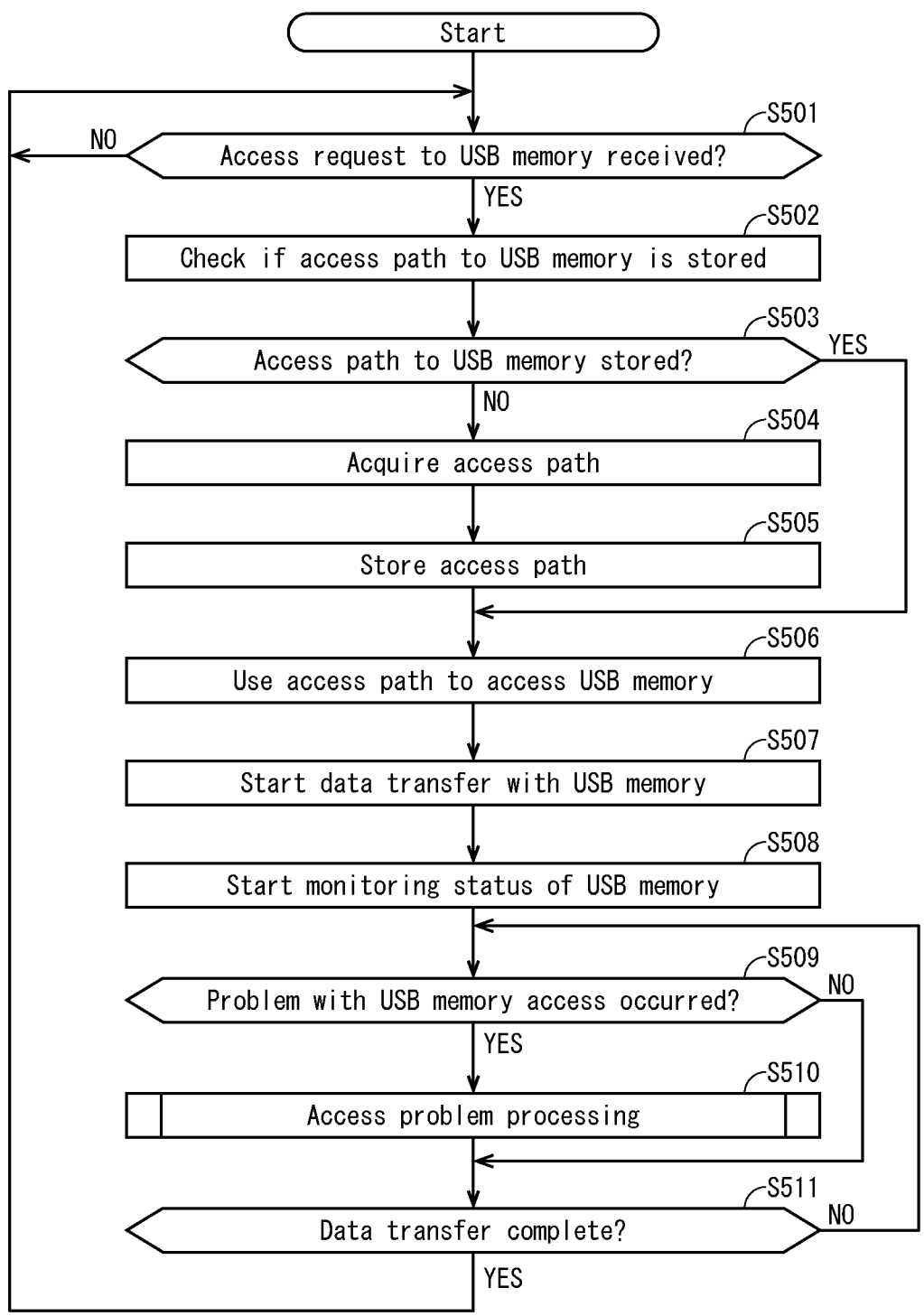
FIG. 5 is a flowchart illustrating a main routine executes by the USB control program 300 in order for an application program 311 to access USB memory.

As illustrated in FIG. 5, when the access control unit 410 of the USB access control program 300 receives an access request to the USB memory from the application program 311 ("YES" in S501), the access path acquisition unit 411 checks whether an access path to the USB memory is stored (S502).

The access path is a list of directory names separated by delimiters such as slashes and backslashes according to a directory structure managed by the OS 331 file system. The access path may include a file name at the end.

The access path for accessing the USB memory may be an absolute path representing a path from the root. If a current directory is specified, the access path may be a relative path representing a path from the current directory.

The USB access control program 300 may receive specification of the current directory from the application program 311. Further, if the current directory is stored in the RAM 203 or the HDD 204, the stored current directory may be used.

As described above, the access path acquisition unit 411 can store the access path in the access path storage area 231. In step S502, the access path acquisition unit 411 checks whether the access path is stored in the access path storage area 231.

If the access path is not stored ("NO" in S503), the access path is obtained from the device control layer 320 (S504). In this case, the access path is requested from the device control program group 322 via the interlayer communication interface 321 on the device control layer 320 side by using the interlayer communication interface 312 on the application layer 310 side, as described above.

The device control program group 322 acquires the access path by using a system call of the OS 331. When the device control program group 322 acquires the access path, the device control program group 322 notifies the access path acquisitions unit 411 of the access path via the interlayer communication interface 312 on the application layer 310 side by using the interlayer communication interface 321 on the device control layer 320 side.

When the access path acquisition unit 411 requests the access path using the interlayer communication interface 312 on the application layer 310 side, the following three request methods can be considered. That is, when the API for acquiring the access path is prepared in the interlayer communication interface 312 on the application layer 310 side, the access path can be acquired using the API.

Further, an API may be prepared by the interlayer communication interface 312 on the application layer 310 side that can transfer data to USB memory without specifying an access path (path information-free interface), for example an API for acquiring an access path by specifying a data size for requesting data transfer as a minimum data size.

In this case, the access path can be acquired by analyzing a return value and operation log of the API of the interlayer communication interface 312 on the application layer 310 side when data transfer is requested.

The operation log is managed by the device control program group 322. The device control program group 322 sends the operation log to the access path acquisition unit 411 of the USB access control program 300 via the interlayer communication interface 321 on the device control layer 320 side and the interlayer communication interface 312 on the application layer 310 side.

In particular, when zero can be specified as the data size for which transfer is requested, the access path may be acquired by specifying zero as the data size and requesting data transfer. The smaller the data size of data requested to be transferred, the more the processing load on the device control layer 320 and the OS layer 330 to acquire the access path can be reduced.

In this case also, the access path acquisition unit 411 can acquire the access path by analyzing the return value and the operation log of the system call of the OS 331 when the data transfer is requested. Further, specification of which of these acquisition methods is used to acquire the access path may be received.

The access path acquisition unit 411 may accept specification of the access path acquisition method from the application program 311. Alternatively, specification of the access path acquisition method may be stored in a predefined storage area of the ROM 202 or the HDD 204, and the stored specification may be referred to.

If there are advantages and disadvantages to each access path acquisition method, the access path acquisition unit 411 can acquire the access path by receiving specification and using the desired acquisition method.

After acquiring the access path, the access path acquisition unit 411 stores the acquired access path in the access path storage area 231 (S505).

In this way, although it is necessary to use the interlayer communication interface 312 on the application layer 310 side in order to acquire the access path for a first access of the USB memory, second and subsequent accesses can be performed by acquiring the access path by referring to the access path storage area 231.

Therefore, it is not necessary to use the interlayer communication interface 312 on the application layer 310 side, and processing overhead for the access path acquisition unit 411 to acquire the access path is reduced, and therefore access speed to the USB memory can be improved.

After storing the USB memory access path in the access path storage area 231 in S505, the access control unit 410 accesses the USB memory using the newly acquired access path (S506). If the access path is stored in the access path storage area 231 ("YES" in S503), the access control unit 410 accesses the USB memory using the access path stored in the access path storage area 231 (S506).

In this way, the access control unit 410 starts data transfer to and from the USB memory by directly using a system call of the OS 331 without going through the device control layer 320. Further, USB memory status monitoring starts (S508). That is, the monitoring unit 412 acquires USB memory status, and the status management unit 430 executes processing according to the USB memory status.

Subsequently, if it is detected that a problem related to access to the USB memory has occurred ("YES" in S509), access problem processing (described later) is executed (S510). Regarding whether or not a problem has occurred in accessing USB memory, as described above, the status management unit 430 may make a judgment according to a status acquired by the monitoring unit 412 referring to a return value of a system call of the OS 331.

If there is no problem in accessing the USB memory ("NO" in S509), or if data transfer with the USB memory is not yet complete after access problem processing ("NO" in S511), processing proceeds to step S509 while continuing data transfer with the USB memory. If data transfer with the USB memory is complete ("YES" in S511), processing proceeds to step S501 and waits for a next request for access to the USB memory from the application program 311.

By doing so, it is possible to directly request the OS 331 for access to the USB memory without going through the device control layer 320, and therefore processing load and processing time for accessing the USB memory can be reduced.

[6] Access Problem Processing (S510)

The following describes access problem processing (S510) executed by the USB access control program 300.

Figure 6:
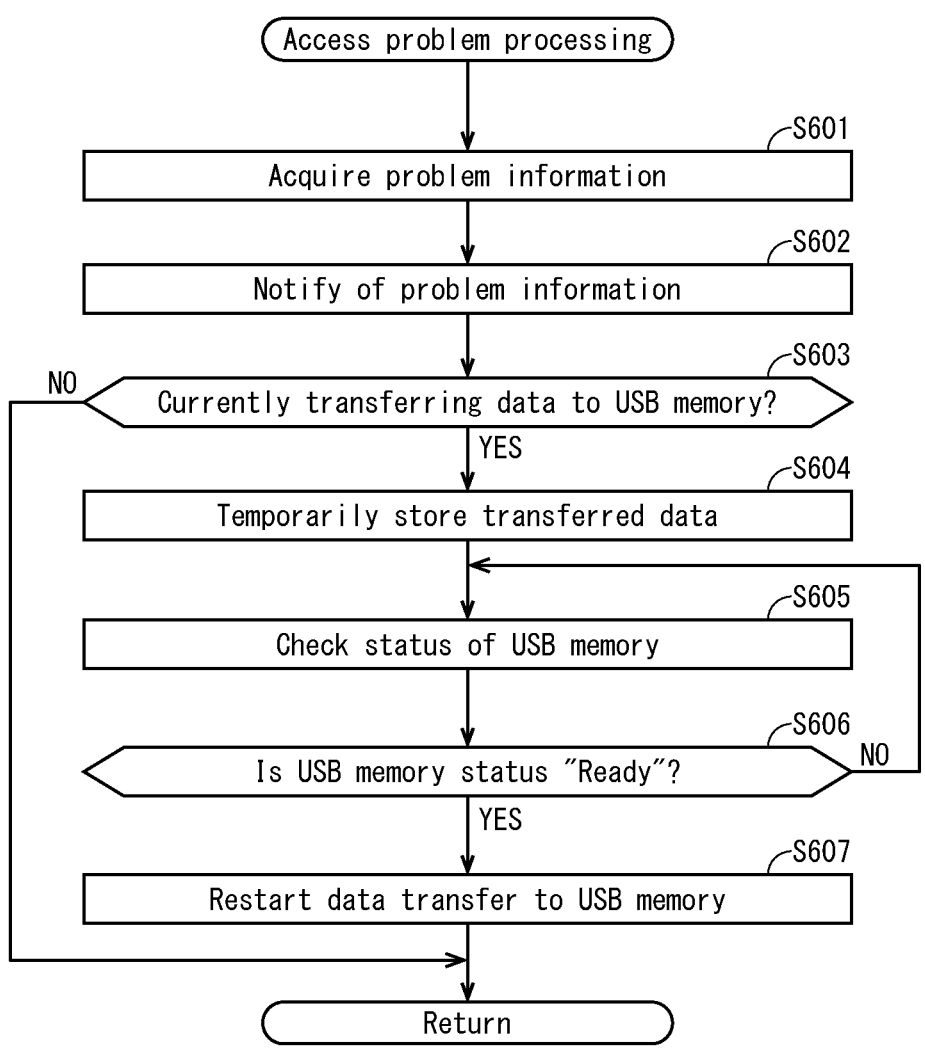
FIG. 6 is a flowchart illustrating access error processing, which is a subroutine executed by the USB access control program 300 when an error occurs during access to USB memory.

In the access problem processing (S510), the monitoring unit 412 acquires the status of the USB memory as problem information (S601), as illustrated in FIG. 6. For example, when a system call of the OS 331 used by the access control unit 410 to transfer data with the USB memory returns a value according to a problem type, the monitoring unit 412 can acquire problem information from the return value.

Further, if the OS 331 has a system call that can acquire status information of a USB memory or the USB interface unit 211 from the USB interface driver 332, the monitoring unit 412 may use the system call, acquire status information of the USB memory and/or the USB interface unit 211, and the status management unit 430 may determine a problem type from the acquired status information.

The following are example problems that may occur when transferring data with a USB memory:

(a) memory size of the USB memory is full,
(b) data transfer with the USB is interrupted due an access interrupt,
(c) data cannot be transferred to or from the USB memory because another task is using the USB memory,
(d) the USB memory was removed from the USB interface 211 during data transfer with the USB memory,
(e) the USB memory malfunctioned and therefore data transfer cannot continue, and
(f) when there are multiple USB ports, and the number of the USB devices 221 attached to the USB ports is too large and power reduction occurs, data transfer with the USB memory cannot be executed.

The monitoring unit 412 directly uses a system call of the OS 331, and therefore can acquire problem information even if an API for acquiring information about a problem that occurred during data transfer with the USB memory is not prepared in the interlayer communication interface 312 on the application layer 310 side.

In this sense, it is not necessary to prepare an API for acquiring the problem information in the interlayer communication interface 312 on the application layer 310 side or the interlayer communication interface 321 on the device control layer 320 side.

Therefore, the interlayer communication interface 312 on the application layer 310 side and the interlayer communication interface 321 on the device control layer 320 side can be simplified, and therefore processing loads and processing times of the interfaces 312, 321 can be reduced.

Further, even if an API is provided to the interlayer communication interface 312 on the application layer 310 side, as long as problem information is acquired using a system call of the OS 331, processing load and processing time for acquisition can be reduced, and therefore problem information can be acquired promptly.

When the monitoring unit 412 acquires problem information, the status management unit 430 notifies the application program requesting data transfer with the USB memory of the acquired problem information (S602). As a result, the application program 311 may notify a user of the image forming device 1 of the problem information, or may redo data transfer to ensure data transfer with the USB memory.

As described above, the status management unit 430 records a problem information log in the application log DB 241. Alternatively or additionally, the application program 311 may record the problem information received from the status management unit 430.

When both the application program 311 and the USB access control program 300 record log data, software operation can be analyzed in more detail than when only one records the log data. Recording log data in this way is useful as it helps infer causes of problems by analyzing log data.

Next, when the access control unit 410 is transferring data to the USB memory ("YES" in S603), the temporary data storage processing unit 420 temporarily stores data to be transferred to the USB memory in the temporary storage area 242 (S604). Subsequently, the monitoring unit 412 uses a system call of the OS 331 to check the USB memory status (S605).

If the acquired USB memory status is not "ready", that is, if the status is not one where data transfer to the USB memory can be accepted ("NO" in S606), processing proceeds to step S605, and the monitoring unit 412 again references the USB memory status (S605).

If the USB memory status acquired by the monitoring unit 412 is "ready", that is, if the status is such that data transfer to the USB memory can be accepted ("YES" in S606), the status management unit 430 determines that data can be transferred to the USB memory, and the access control unit 410 resumes data transfer to the USB memory (S607).

In this case, the USB access control program 300 first transfers data temporarily stored in the temporary storage area 242 to the USB memory. Subsequently, the USB access control program 300 transfers data newly requested to be transferred to the USB memory by the application program 311.

When data transfer to the USB memory resumes, processing returns to the main routine.

In this way, information such as USB memory status can be acquired directly from the USB interface driver of the OS 331, and therefore operation when a problem occurs can be controlled similarly to an operation of single-layer architecture. That is, fail-safe control can be performed in the same way as in a case of single-layer architecture.

Further, the monitoring unit 412 can acquire the USB memory status and the status management unit 430 can be notified of the USB memory status, and therefore the application layer 310 can use USB access in consideration of the USB memory status.

Further, in a case where the application program 311 receives data from a cloud system and transfers the data to USB memory, and in particular when an amount of data to be transferred to the USB memory is large, then even when the USB becomes unable to continue the data transfer, the temporary data storage processing unit 420 temporarily stores data in the temporary storage area 242, and therefore the application program 311 can continue data transfer without being aware of the USB memory status.

In this way, as long as the status management unit 430 executes fail-safe control when the USB memory cannot continue data transfer, executing fail-safe control is not necessary for the application program 311, and therefore processing load, development cost, and program size of the application program 311 can be reduced.

[7] Comparison with Conventional Art

The following compares the present embodiment with conventional art.

Improving access efficiency from the application program 311 to USB memory in the image forming device 1 is, in other words, improving data writing efficiency in an information processing device.

In order to achieve such an object, for example, a conventional technique has been proposed according to which, when an access request to a storage device is generated in an information processing device, access is processed by selecting either a direct I/O or a buffered I/O access method, depending on at least one of an attribute of the application program that requested access and write data size associated with the access request (for example, see JP 2011-258027).

However, if the access method is switched as per the conventional technique mentioned above, access to a lower layer in multi-tier architecture has to go through an abstraction layer, and the overhead due to many interface calls in the abstraction layer cannot be reduced.

Further, a conventional technique has been proposed that switches data transfer paths between nodes that constitute a parallel computer, in order to prevent data transfer by an application program from being hindered or reduced in performance by data transfer by an operating system (for example, see JP 2007-156851).

According to this conventional technique, paths for transferring data between nodes can be switched, but when each node is provided with multi-tier architecture software, overhead of abstraction layers when processing application program data transfer cannot be reduced.

Further, a conventional technique has been proposed that eliminates contention been data and commands at a time of transfer, by sending data and commands for controlling data transfer between a file server and network storage by separate paths that are not between nodes that make up a parallel computer (for example, see JP 2004-220216).

According to this conventional technique, application programs can transfer data and commands between file storage and network storage via separate routes, but when the file server is provided with multi-tier architecture software, overhead of abstraction layers when transferring data cannot be reduced.

Further, a conventional technique has been proposed to execute I/O processing efficiently by directly exchanging data between I/O devices such as network adapters and disk controllers, thereby minimizing use of a processor, main storage, and system bus resources of a server computer (for example, see JP 2000-047952).

According to this conventional technique, I/O processing can be made more efficient, but software processing in an abstraction layer up to I/O processing cannot be made more efficient.

Further, a conventional technique has been proposed for accelerating file exchange and sharing by exchanging information in a common format between computers having difference types of operating system (for example, see JP 2001-084168).

While this conventional technique can share data location information between computers, it cannot reduce overhead in abstraction layers of individual computers.

In contrast, the image forming device 1 according to the present embodiment relays access from the application program 311 to an external device by using the access control program 300 that accesses a lower layer from an upper layer without passing through an abstraction layer, which is a structure different from that of the conventional techniques described above.

With such a structure, overhead of an abstraction layer in software of multi-tier architecture can be avoided when the application program 311 accesses an external device.

Accordingly, efficiency of access to USB memory from the application program 311 can be improved.

Further, the access control program 300 can store path information for accessing the external device, and therefore overhead for acquiring path information can be reduced by accessing the external device using stored path information.

In this sense as well, efficiency of access to USB memory from the application program 311 can be improved.

[8] Modifications

Although the present disclosure has provided description of the embodiments above, the present disclosure is of course not limited to the embodiments described above, and the following modifications can be implemented.

(8-1) According to at least one embodiment, access problem processing (S510) is executed when a USB memory problem is detected, but the present disclosure is of course not limited to this, and the following modifications are possible.

Figure 7:
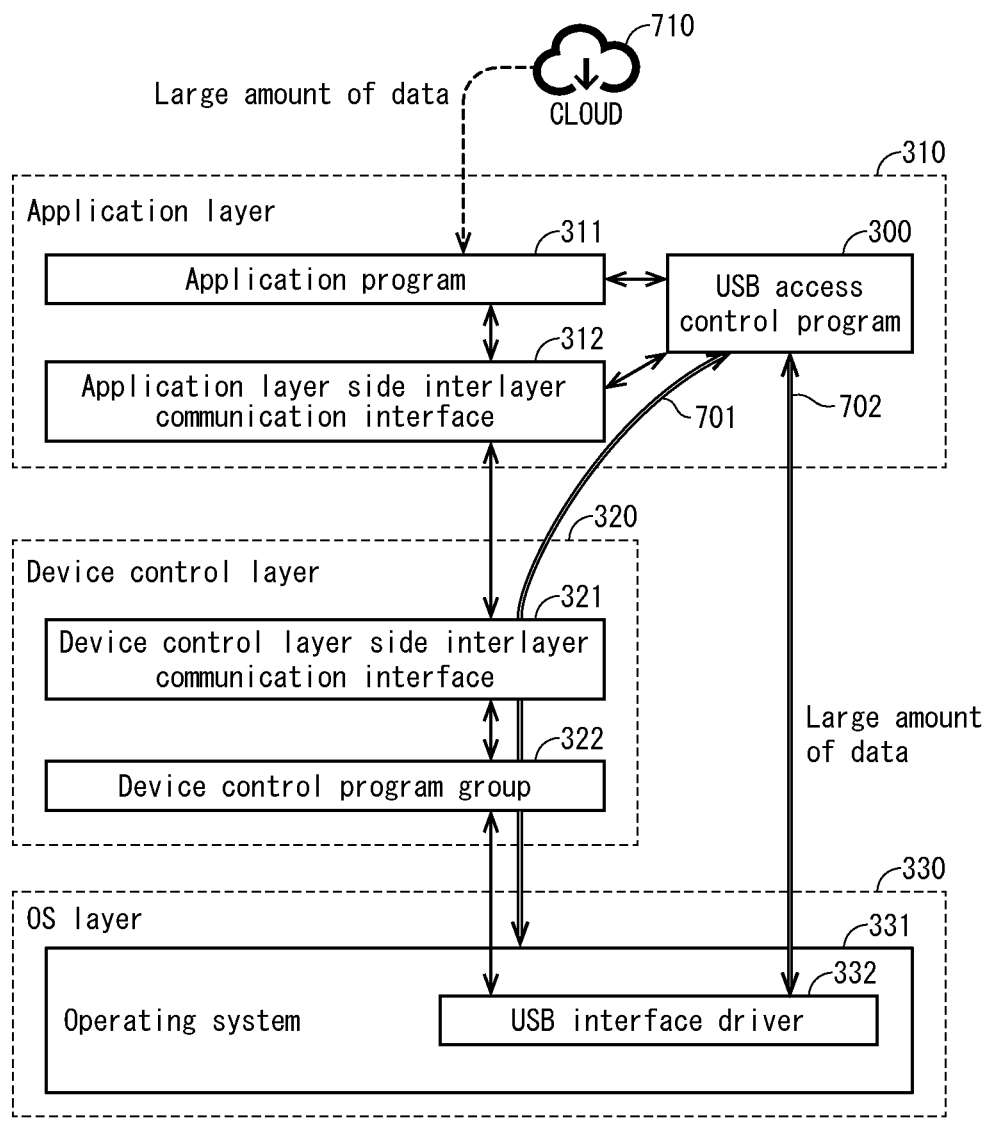
FIG. 7 is a diagram illustrating an operation when a monitoring unit 412 acquires USB memory status information via a device control layer 320 in the image forming device 1 according to a modified embodiment of the present disclosure.

For example, as illustrated by a double-headed arrow 701 in FIG. 7, the monitoring unit 412 of the USB access control program 300 may acquire USB memory status using the interlayer communication interface 312 on the application layer 310 side, and notify the status management unit 430.

Figure 8:
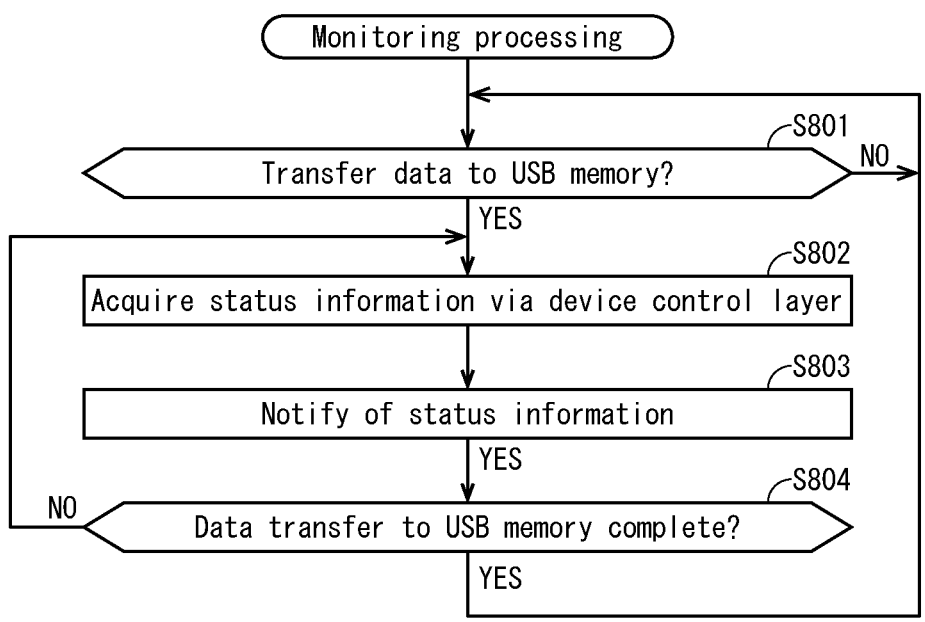
FIG. 8 is a flowchart illustrating an operation in which the monitoring unit 412 according to a modified embodiment of the present disclosure acquires USB memory status information via the device control layer 320.

That is, as illustrated in FIG. 8, when transferring data from the application program 311 to the USB memory ("YES" in S801), USB memory status is acquired via the device control layer 320 by using the interlayer communication interface 312 on the application layer 310 side (S802).

When using the interlayer communication interface 312 on the application layer 310 side, the access control unit 410 may acquire the USB memory status in parallel with data transfer to or from the USB memory using a system call of the OS 331.

USB memory status that can be acquired in this way is, for example, USB memory storage capacity, an amount of data stored in USB memory, information on management and control of USB memory, USB memory state information, and the like.

By doing so, for example as illustrated by the double arrow 702 in FIG. 7, when writing a large amount of data to USB memory, the USB memory storage capacity and an amount of data stored in the USB memory are referenced, and therefore it is possible to detect when the USB memory is approaching full capacity before the USB memory becomes full.

Subsequently, the monitoring unit 412 notifies the status management unit 430 of the acquired status (S803). Subsequently, if data transfer to the USB memory is not complete ("NO" in S804), processing proceeds to step S802 and the above processing is repeated. If data transfer to the USB memory is completed ("YES" in S804), processing proceeds to step S801 and waits for a next transfer.

In this way, the monitoring unit 412 can acquire USB memory status and notify the status management unit 430 before a USB memory problem occurs.

Figure 9:
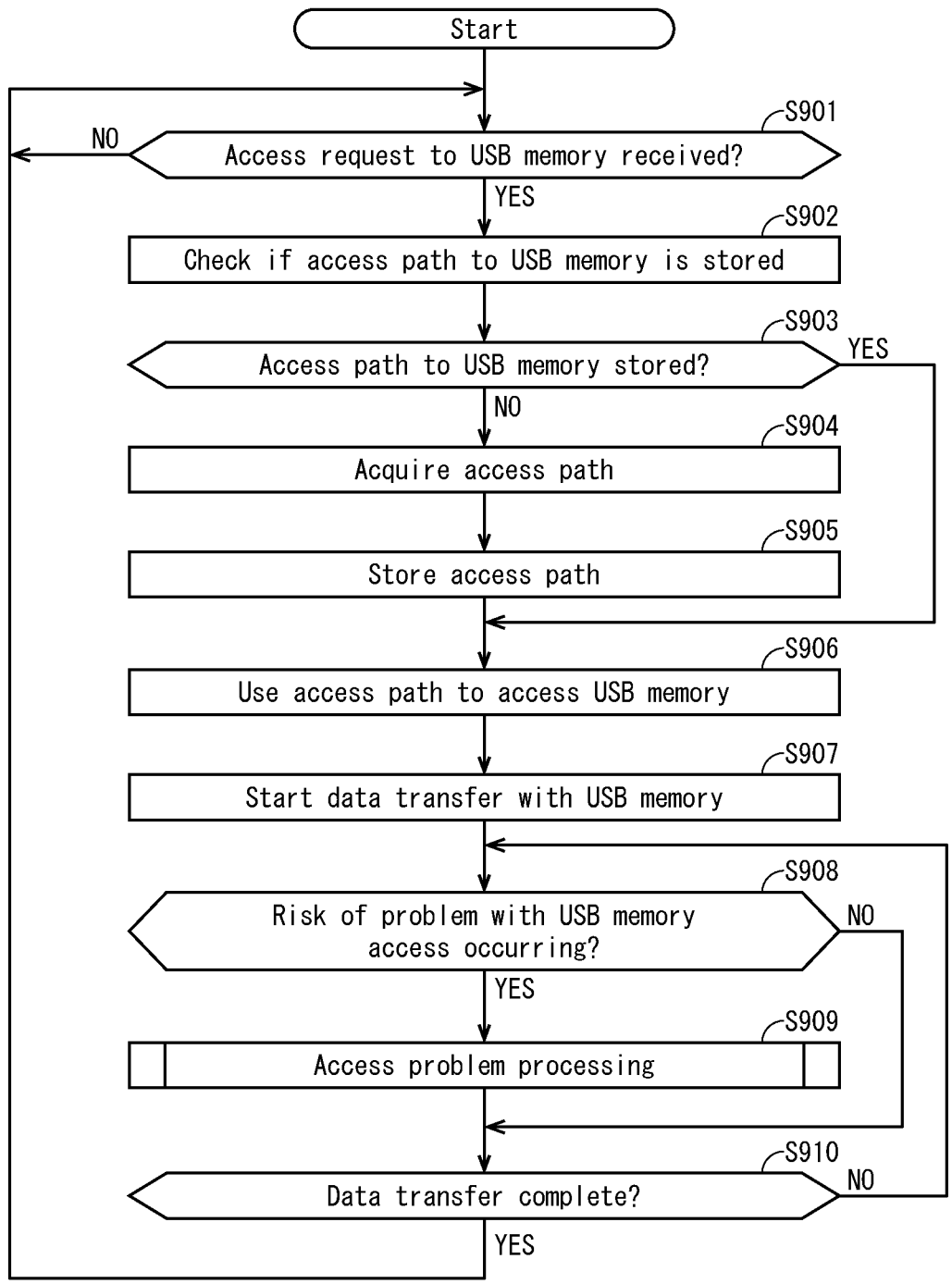
FIG. 9 is a flowchart illustrating an operation of a USB access control program 300 according to a modified embodiment of the present disclosure, and in particular processing of a status management unit 430.
Figure 10:
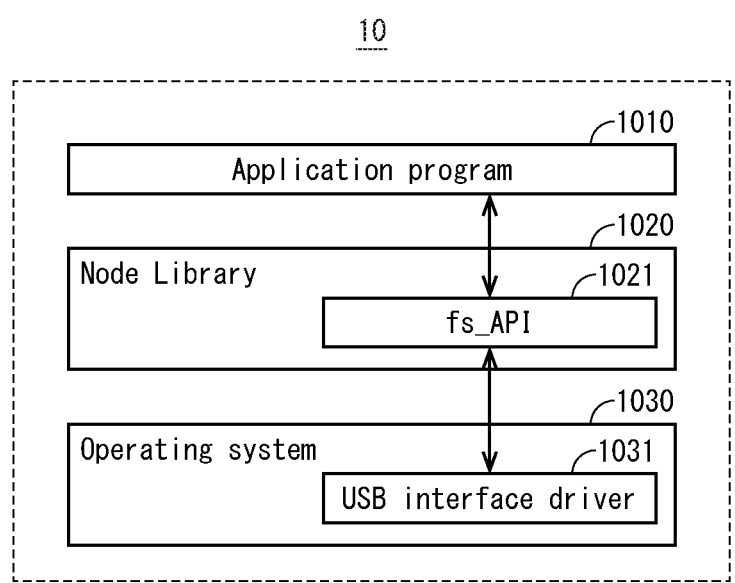
FIG. 10 is a diagram illustrating single-tier architecture of software according to conventional art.
Figure 11:
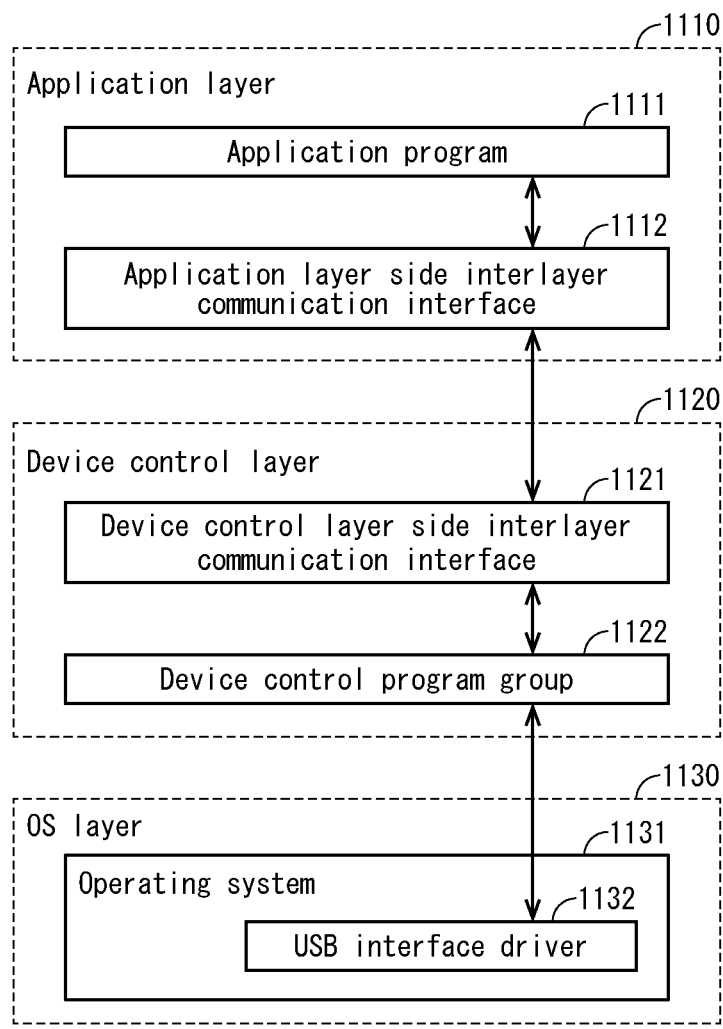
FIG. 11 is a diagram illustrating multitier architecture of software according to conventional art.

Accordingly, in the main routine of the USB access control program 300, as illustrated in FIG. 9, the status management unit 430 determines whether or not there is a possibility that a problem may occur in USB memory access, and when there is a possibility ("YES" in S908), access problem processing (S909) can be executed even if a problem has not yet actually occurred.

For example, when an instruction to transfer large amount of data from a high capacity storage such as a cloud storage 710 to a USB memory is received, then even if no problem has occurred with the USB memory, the monitoring unit 412 can acquire the USB memory status so that the status management unit 430 can acquire free capacity of the USB memory.

As a result, if it is determined that free capacity of the USB is smaller than an amount of data the instruction indicates is to be transferred, the status management unit 430 can warn the source of the instruction. By receiving a warning, a user could replace the USB memory that has insufficient free space with a USB memory that has sufficient free space.

Further, even if the instruction to transfer data is maintained without replacing the USB memory, despite the warning, the status management unit 430 can acquire free capacity of the USB memory due to the monitoring unit 412 acquiring the USB memory status even if no problem has occurred with the USB memory.

As a result, when the status management unit 430 detects that the USB memory is approaching a full memory state, then before the USB memory is actually full, the status management unit 430 can warn the source of the instruction to transfer data that the USB memory attached to the image forming device 1 has insufficient capacity, and that data transfer cannot be continued.

On receiving this warning, a user could remove the USB memory that is approaching a full memory state from the image forming device 1, and install a USB memory with sufficient free space, such that untransferred data can be transferred to the new USB memory. Accordingly, the state of the USB memory becoming full can be avoided.

Further, in this case, if data transfer to the USB memory is temporarily suspended and data to be transferred to the USB memory is stored in the temporary storage area 242, then data transfer from the cloud storage to the application program 311 can continue regardless of the status of the USB memory.

If the source of the instruction to transfer data instructs that data transfer should continue without replacing the USB, despite the warning that the USB memory is approaching a full memory state, then a full memory state occurs, which a USB memory problem. Processing when a full memory state occurs can, for example, be executed as described according to at least one embodiment above.

(8-2) According to at least one embodiment, access from the application program 311 to USB memory connected to the image forming device 1 is made efficient, but the present disclosure is of course not limited to this.

A USB storage other than a USB memory, such as a USB hard disk, may be connected to the USB interface 211 and accessed from the application program 311.

Further, an external authentication device such as a card reader or biometric authentication device, or an image capture device (camera) for capturing still or moving images may be connected to the USB interface unit 211 and accessed from the application program 311.

Such external devices other than a USB memory may be connected to the USB interface 211 and accessed from the application problem 311.

Further, the image forming device 1 may be provided with an interface conforming to a standard other than USB, and the present disclosure is also applicable to a case where an external device connected to an interface conforming to a standard other than USB is accessed from the application program 311, and improves access efficiency in such a case.

In this case, a dedicated access control program may be used instead of the USB access control program 300.

Examples of external devices connected to an interface conforming to a standard other than USB include Secure Digital (SD) memory cards and multimedia cards, for example.

(8-3) According to at least one embodiment, access from the application program 311 to an external device connected to the image forming device 1 is made efficient, but the present disclosure is of course not limited to this.

For example, when wanting to control access to resources and devices at a timing from an application, or when wanting to perform an image adjustment at level not normally used, from an application, or the like, if the interlayer communication interface 312 on the application layer 310 side or the interlayer communication interface 321 on the device control layer 320 side is modified to add functions, the advantage of using the device control layer 320 as an abstraction layer is impaired.

In this case as well, by using the access control program 300 that directly uses a system call of the OS 331 to control access to resources and devices at a timing from an application, and to perform image adjustment at a level not normally used from an application, access efficiency can be improved without compromising the advantages of using the device control layer 320 as an abstraction layer be not going through the device control layer 320.

Therefore, for example, even if the interlayer communication interface 312 on the application layer 310 side is not provided with an interface for notifying of a problem related to the image forming device 1 or an external device, the application program 311 can execute a control for a fail-safe.

(8-4) According to at least one embodiment, the control unit 410 is a control board that has a single CPU, but the present disclosure is of course not limited to this, and may be a control board that has multiple CPU, for example. Further, the control unit 410 may be divided into multiple circuit boards.

Regardless of hardware structure of the control unit 410, effects can be achieved by application of the present disclosure.

(8-5) According to at least one embodiment, the image forming device 1 is a multi-function peripheral, but the present disclosure is of course not limited to this. Instead, the image forming device 1 may be a single function device such as a printer, a scanner, a photocopier, a facsimile machine, or the like.

Similar effects can be achieved by applying the present disclosure, regardless of the type of the image forming device 1.

(8-6) According to at least one embodiment, an image forming device is described, but the present disclosure is not limited to this. For example, the present disclosure is applicable to a processing method executed by an image forming device. Further, the present disclosure is applicable to a program that causes a computer to execute such a processing method.

Further, a program according to the present disclosure can be recorded on various computer-readable recording media, such as magnetic tape, magnetic disks such as flexible disks, optical recording media such as DVD-ROM, DVD-RAM, CD-ROM, CD-R, MO, PD, flash memory recording media, and the like, produced or transferred in the form of such recording media, and may be transmitted and supplied via various wired and wireless networks including the Internet, broadcasting, telecommunication lines, satellite communications, and the like.

(8-7) The present disclosure may be realized as any combination of the embodiments and modifications described above.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming device to which an external device is detachably attached, the image forming device comprising:
   an interface that is able to attach to the external device;
   a storage that stores multi-tier architecture software; and
   a computer that executes the multi-tier architecture software,
   the multi-tier architecture software comprising:
   a lower layer that includes an operating system (OS) that manages the external device attached to the interface;
   an upper layer that includes an application program that accesses the external device via the lower layer; and
   an abstraction layer that intervenes between the lower layer and the upper layer and hides implementation of the lower layer from the upper layer, wherein
   the upper layer includes an access control program,
   the access control program:
   is able to save path information to access the external device to the storage, and
   relays access from the application program of the upper layer to the external device by accessing the lower layer without going through the abstraction layer and accessing the external device using the path information.

2. The image forming device of claim 1, wherein the abstraction layer includes a device control program.

3. The image forming device of claim 1, wherein the access control program includes a path information acquisition program that is executed by the computer to acquire the path information via the abstraction layer.

4. The image forming device of claim 3, wherein the path information acquisition program is executed by the computer to acquire the path information when the access control program makes the application program access the external device and the path information is not already stored.

5. The image forming device of claim 3, wherein the abstraction layer provides the upper layer with a path information-free interface for accessing the external device from the upper layer without receiving specification of path information from the upper layer.

6. The image forming device of claim 5, wherein
   the path information-free interface provides path information to the upper layer when accessing the external device from the upper layer, and
   the path information acquisition program is executed by the computer to acquire path information provided by accessing the external device using the path information-free interface.

7. The image forming device of claim 6, wherein the path information acquisition program is executed by the computer to acquire path information by transferring a minimum amount of data required for the path information-free interfaces to provide path information to the external device.

8. The image forming device of claim 7, wherein the minimum amount of data is empty data.

9. The image forming device of claim 1, wherein the upper layer includes a monitoring program that is executed by the computer to acquire a status of the external device.

10. The image forming device of claim 9, wherein the monitoring program is executed by the computer to access the lower layer to acquire the status of the external device without going through the abstraction layer.

11. The image forming device of claim 10, wherein the monitoring program is executed by the computer to acquire the status of the external device when a failure occurs while accessing the external device.

12. The image forming device of claim 10, wherein the monitoring program is executed by the computer to acquire the status of the external device from a hardware abstraction layer of the OS.

13. The image forming device of claim 9, wherein the monitoring program is executed by the computer to access the lower layer via the abstraction layer to acquire the status of the external device.

14. The image forming device of claim 13, wherein the monitoring program is executed by the computer to acquire the status of the external device while accessing the external device.

15. The image forming device of claim 9, wherein the upper layer includes a status management program that is executed by the computer to control access to the external device according to the status of the external device acquired by the monitoring program.

16. The image forming device of claim 15, wherein if the status indicates that access to the external device has been interrupted, the status management program is executed by the computer to temporarily put access to the external device into a standby state.

17. The image forming device of claim 16, wherein
the upper layer includes a temporary storage program that when executed by the computer, when the status management program temporarily puts access to the external device into the standby state and the access is for data transfer to the external device, causes the data to be transferred to be temporarily stored, and
transfers the temporarily stored data to the external device when the status management program ends the standby state.

18. The image forming device of claim 15, wherein the status management program is executed by the computer to interrupt or stop access to the external device if the status indicates that the external device has a full memory, is faulty, or has a problem of unknown cause.

19. A program executed by a computer in an image forming device to which a device is detachably attached, the image forming device including a storage, the program having multi-tier architecture comprising:
a lower layer that includes an operating system (OS) that manages an external device when attached:
an upper layer that includes an application program that accesses the external device via the lower layer; and
an abstraction layer that intervenes between the lower layer and the upper layer and hides implementation of the lower layer from the upper layer, wherein
the upper layer causes the computer to execute:
a saving step of saving path information to access the external device to the storage; and
an access control step of relaying access from the application program of the upper layer to the external device by accessing the lower layer without going through the abstraction layer and accessing the external device using the path information.

* * * * *